United States Patent
Tegegne et al.

(10) Patent No.: US 10,594,701 B1
(45) Date of Patent: *Mar. 17, 2020

(54) SYSTEMS AND METHODS FOR SECURE DEVICE MANAGEMENT

(71) Applicant: Quest Software Inc., Aliso Viejo, CA (US)

(72) Inventors: Abel Tegegne, Ottawa (CA); Michel Albert Brisebois, Renfrew (CA)

(73) Assignee: Quest Software Inc., Aliso Viejo, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/153,282

(22) Filed: Oct. 5, 2018

Related U.S. Application Data (63) Continuation of application No. 15/006,875, filed on Jan. 26, 2016, now Pat. No. 10,129,262.

(51) Int. Cl.
 *G06F 17/00* (2019.01)
 *H04L 29/06* (2006.01)

(52) U.S. Cl.
 CPC .......... *H04L 63/102* (2013.01); *H04L 63/20* (2013.01)

(58) Field of Classification Search
 CPC ... H04L 63/102; H04L 63/20; H04L 63/0876; G06F 21/554; G06F 17/30985
 USPC .......................................... 726/1, 26–27, 29
 See application file for complete search history.

(56) References Cited

U.S. PATENT DOCUMENTS

| | | | |
|---|---|---|---|
| 7,730,170 B2 * | 6/2010 | Richard | H04L 41/00 709/223 |
| 8,161,135 B2 | 4/2012 | Hietasarka et al. | |
| 8,204,831 B2 * | 6/2012 | Jonas | G06F 21/6245 705/50 |
| 8,730,872 B2 | 5/2014 | Elmaleh | |
| 9,444,839 B1 * | 9/2016 | Faulkner | H04L 63/1466 |
| 9,489,513 B1 * | 11/2016 | Mesropian | G06F 21/566 |
| 2013/0178190 A1 * | 7/2013 | Celi, Jr. | H04W 12/0023 455/411 |

(Continued)

OTHER PUBLICATIONS

Olayiwola, Caleb; "Full Procedures on How to Change Android Phones IMEI Number to Blackberry"; http://www.ccnworldtech.com/2014/09/full-procedures-on-how-to-change.html; updated on Feb. 21, 2015; 3 pages.

(Continued)

*Primary Examiner* — Samson B Lemma
(74) *Attorney, Agent, or Firm* — Winstead PC (57) ABSTRACT

In one embodiment, a method is performed by a computer system. The method includes receiving base attribute values of a registrant device. The method further includes determining similarities of the base attribute values to a reference string to yield base similarity values. The method also includes registering the registrant device for policy enforcement using the base similarity values. Furthermore, the method includes, responsive to a trigger, determining target attribute values of a target device. Also, the method includes determining similarities of the target attribute values to the reference string to yield target similarity values. Moreover, the method includes, responsive to the target similarity values satisfying a similarity threshold in relation to the base similarity values, configuring policy enforcement such that the target device is treated as the registrant device.

18 Claims, 4 Drawing Sheets

(56) References Cited

U.S. PATENT DOCUMENTS

| | | | | |
|---|---|---|---|---|
| 2013/0247145 | A1* | 9/2013 | Gebara | G11C 29/50 |
| | | | | 726/2 |
| 2013/0282580 | A1* | 10/2013 | O'Brien | G06Q 20/4014 |
| | | | | 705/44 |
| 2013/0311445 | A1* | 11/2013 | Narita | G06F 16/90344 |
| | | | | 707/714 |
| 2016/0062782 | A1* | 3/2016 | Liu | G06F 9/45558 |
| | | | | 718/1 |
| 2016/0099963 | A1* | 4/2016 | Mahaffey | H04L 63/0227 |
| | | | | 726/25 |
| 2016/0350610 | A1* | 12/2016 | Yoo | G06K 9/00369 |
| 2017/0142133 | A1* | 5/2017 | Kallos | H04L 63/1408 |

OTHER PUBLICATIONS

Future of Privacy Forum et al.; "Best Practices for Mobile Application Developers"; Jul. 2012; 20 pages.

Future of Privacy Forum; "Application Privacy: Device Identifiers"; http://www.applicationprivacy.org/learn-resources/unique-device-identifier-udid-2; Jun. 20, 2014; 2 pages.

Perez, Sarah; "iOS 7 Eliminates MAC Address as Tracking Option, Signaling Final Push towards Apple's own Ad Identifier Technology"; http ://techcrunch.com/2013/06/14/ios-7-eliminates-mac-address-as-tracking-option-signali . . . ; Jun. 14, 2013; 3 pages.

Oracle Corporation; "Oracle® Adaptive Access Manager: Reference Guide: Release 10g (10.1.4.5) E12054-03"; May 2009; 216 pages.

\* cited by examiner

SYSTEMS AND METHODS FOR SECURE DEVICE MANAGEMENT

CROSS-REFERENCE TO RELATED APPLICATIONS

This patent application is a continuation of U.S. Ser. No. 15/006,875 filed Jan. 26, 2016. U.S. patent application Ser. No. 15/006,875 is incorporated by reference herein in its entirety.

BACKGROUND

Technical Field

The present disclosure relates generally to data security and more particularly, but not by way of limitation, to systems and methods for secure device management.

History Of Related Art

In device management, device information may be stored for later comparison and matching. However, the storage of device information raises privacy concerns. Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving base attribute values of a registrant device. The method further includes determining similarities of the base attribute values to a reference string to yield base similarity values. The method also includes registering the registrant device for policy enforcement using the base similarity values. Furthermore, the method includes, responsive to a trigger, determining target attribute values of a target device. Also, the method includes determining similarities of the target attribute values to the reference string to yield target similarity values. Moreover, the method includes, responsive to the target similarity values satisfying a similarity threshold in relation to the base similarity values, configuring policy enforcement such that the target device is treated as the registrant device.

In one embodiment, an information handling system includes a processor. The processor is operable to implement a method. The method includes receiving base attribute values of a registrant device. The method further includes determining similarities of the base attribute values to a reference string to yield base similarity values. The method also includes registering the registrant device for policy enforcement using the base similarity values. Furthermore, the method includes, responsive to a trigger, determining target attribute values of a target device. Also, the method includes determining similarities of the target attribute values to the reference string to yield target similarity values. Moreover, the method includes, responsive to the target similarity values satisfying a similarity threshold in relation to the base similarity values, configuring policy enforcement such that the target device is treated as the registrant device.

In one embodiment, a computer-program product includes a non-transitory computer-usable medium having computer-readable program code embodied therein. The computer-readable program code is adapted to be executed to implement a method. The method includes receiving base attribute values of a registrant device. The method further includes determining similarities of the base attribute values to a reference string to yield base similarity values. The method also includes registering the registrant device for policy enforcement using the base similarity values. Furthermore, the method includes, responsive to a trigger, determining target attribute values of a target device. Also, the method includes determining similarities of the target attribute values to the reference string to yield target similarity values. Moreover, the method includes, responsive to the target similarity values satisfying a similarity threshold in relation to the base similarity values, configuring policy enforcement such that the target device is treated as the registrant device.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

In various embodiments, a device management system, such as a bring-your-own-device (BYOD) management system, can enable creation and administration of policies against particular devices and users. The policies may vary, for example, the extent to which resources can be accessed based, at least in part, on a particular device that is requesting or may request access. In various cases, devices can be distinguished by device attribute values. A device attribute can be any characteristic of a device such as, for example, a device type (e.g., iPhone, Windows Phone, etc.), International Mobile Station Equipment Identity (MEI), device identifier, operating system, device serial number, operating system build code, operatimg system build version, other device features or identifiers, combinations of same and/or the like.

Secure device identification presents numerous technical challenges. For example, one way to enable device identification might be to centrally store attribute values for a set of pre-registered devices. When a particular device attempts to access a resource, the particular device could have its attributes matched to the attributes of the pre-registered devices. Storage of information sufficient to precisely identify devices, however, introduces security and privacy concerns. For example, the information can be used for unintended purposes or be the target of a data breach. The above-described approach can also be ineffective because, for example, attribute values needed for a match have changed or are unavailable.

The present disclosure describes examples of securely storing non-sensitive information that can be used to identify and match devices. In certain embodiments, a device management system can use similarity to a reference string as a proxy for device attribute values. The reference string can be, for example, a randomly generated sequence of alphanumeric characters of a configurable length. In certain embodiments, the device management system can determine similarities of device attribute values to the reference string and store values representing those similarities. Advantageously, in some embodiments, the device management system can omit storage of device attribute values in favor of storage of the similarity values. As described in greater detail below, at a time of policy enforcement, the device management system can compare and match similarity values instead of device attribute values and thereby securely and accurately identify devices.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g, personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
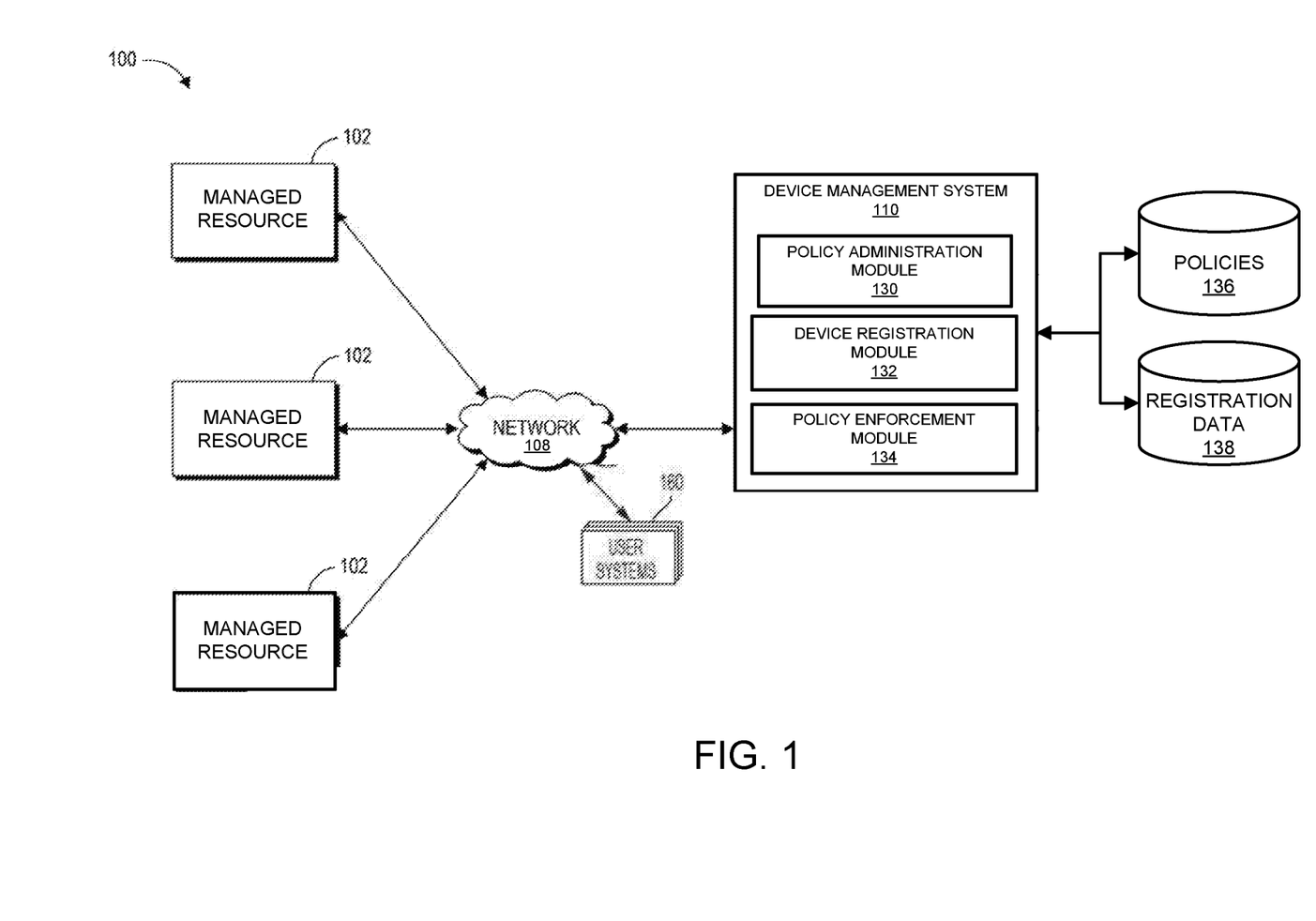
FIG. 1 illustrates an example computing environment for implementing an embodiment of a device management system.

FIG. 1 illustrates an example computing environment 100 for implementing an embodiment of a device management system 110. The computing environment 100 includes the device management system 110, resources 102, user systems 160, and data stores 136 and 138, each of which is operable to communicate over a network 108. The network 108 may be a private network, a public network, a local or wide area network, a portion of the Internet, combinations of the same, and/or the like.

The device management system 110 can manage access to the resources 102. The managed resources 102 may, for instance, include devices in a data center or in a plurality of data centers. Some examples of the managed resources 102 include the following: information handling systems, virtual machines, servers, web servers, application servers, databases, applications, processors, memories, hard drives or other storage devices, peripherals, software components, database tables, tablespaces in a database, application tiers, network switches and other network hardware, combinations of same, and/or the like. The managed resources 102 can be geographically separate or co-located.

In the depicted embodiment, the device management system 110 includes a policy administration module 130, a device registration module 132 and a policy enforcement module 134. Each of these components can be implemented with hardware and/or software, including (optionally) virtual machines or containers. In an example, the device management system 110 can be implemented as a single management server. In another example, the device management system 110 can he implemented in a plurality of virtual or physical servers, which may or may not be geographically co-located. For instance, the device management system 110 and/or other aspects of the computing environment 100 may he hosted in a cloud-based hosting service such as the Azure™ service provided by Microsoft® or the EC2™ platform provided by Amazon®.

In certain embodiments, features of the components of the device management system 110 can be made accessible over an interface to the user systems 160. The user systems 160 can include any type of computing device, including information handling systems such as desktops, laptops, tablets, smartphones, PDAs, to name a few. Further, in some cases, the policy administration module 130, the device registration module 132 and/or the policy enforcement module 134 can publish a configuration interface, for example, to administrators, super users or other users, who can also be using one or more of the user systems 160.

The policy administration module 130 can allow administrators, super users or other users to establish and configure policies that can be stored in the data store 136. In general, the policies can relate to an extent to which particular users and/or devices can access the resources 102. The policies can restrict access based on time periods, device, particular resources of the resources 102, type or classification of resource, other criteria, combinations of same and/or the like. In various cases, the policies can include one or more Boolean expressions that evaluate to true or false. For example, each Boolean expression can specify absolute values and/or ranges of values for each field thereof. The values and/or ranges of values can be connected by Boolean operators such as, for example, AND, OR, and NOT.

The device registration module 132 can enable user devices, such as the user systems 160, to become registered with the device management system 110. In certain embodiments, the device registration module 132 can generate and maintain a reference string. In various cases, the reference string can be a randomly generated string of alphanumeric characters. In some cases, the reference string can be a globally unique identifier (GUID). The reference string can be used to generate non-sensitive information that can identify devices such as the user systems 160.

For example, in an embodiment, the device registration module 132 can he configured to accept device attribute values for a configurable set of device attributes. In the context of registration, a particular device to be registered may be periodically referred to as a registrant device (or as a registered device after registration). Attribute values of the registrant device may be referred to herein as base attribute values.

In certain embodiments, the device registration module 132 can determine similarities of the base attribute values to the reference string to yield similarity values, referred to herein as base similarity values. The base similarity values can be computed as a function of a string matching formula such as, for example, edit distance (e.g., Levenshtein distance, Damerau-Levenshtein distance, etc.), weighted edit distance, longest common substring, combinations of same and/or the like. In various cases, the string matching formula can be applied to raw values (i.e., actual values of the corresponding device attributes) or to a transformation of the raw values such as, for example, a hash of the raw values. For simplicity of description, various functionality described herein will be described in relation to base attribute values. However, it should be appreciated that such description can refer to raw or transformed values as described above. The base similarity values can be stored by device attribute in the data store 138. In some cases, in embodiments in which the raw values are transformed (e.g., by a applying a hash function), hash values may also be stored in the data store 138. Example operation of the device registration module 132 will be described in relation to FIG. 3.

The policy enforcement module 134 can monitor for policy enforcement triggers with respect to devices (such as the user systems 160) that can or may request access to the resources 102. In some cases, the policy enforcement triggers can include a real-time access request by one of the user systems 160 to access a particular resource of the resources 102. In such cases, the user system that initiated the access request can he considered a target device. In other cases, the policy enforcement triggers can include a manual or automatic trigger to configure policy enforcement on some or all of the resources 102, with respect to devices known to the resources 102. In these cases, the devices known to the resources 102 can he considered target devices. In the aforementioned cases, whatever device attribute values of the target devices are available or accessible (e.g., values received from the target devices or that are available in memory) can correspond to target attribute values. As described above in relation to the base attribute values, target attribute values can, in various cases, relate to either raw or transformed values of particular device attributes. In the context of policy enforcement, a particular device may be periodically referred to as a target device.

In certain embodiments, the policy enforcement module 134 can determine similarities of the target attribute values to the reference string to yield similarity values, referred to herein as target similarity values. In general, the target attribute values can be determined in similar fashion to base attribute values as described above. The target similarity values can be compared to base similarity values of like device attributes stored in the data store 138.

If or when the target similarity values satisfy a similarity threshold in relation to a particular registered device, the policy enforcement module 134 can configure policy enforcement such that the target device is treated as the particular registered device. For example, the policy enforcement module 134 can select an applicable policy (e.g., from the data store 136) for the particular registered device and cause the selected policy to be applied (or in fact apply the selected policy) to the target device. In that way, the target device can be granted or denied access based on the policies of the data store 136. In some cases, the policy enforcement module 134 can itself grant or deny access. In other cases, the policy enforcement module can configure a particular resource of the resources 102 (e.g., a resource that the target device is attempting to access) such that the particular resource grants or denies access according to the policies of the data store 136. Example operation of the policy enforcement module 134 will be described in relation to FIG. 4.

Advantageously, in certain embodiments, the device management system 110 enables device identification even when target attribute values and base attribute values do not coextensively refer to an exactly corresponding set of device attributes. Rather, in various cases, different registered devices can have values of different device attributes stored in the data store 138. Similarly, the target attribute values of a given target device and, for example, the base attribute values of the corresponding registered device (assuming one exists) can correspond to non-identical sets of device attributes. For example, devices can be uniquely identified in memory by their similarity values for particular combinations or compositions of device attributes. In certain embodiments, the particular combinations can be pre-configured (e.g., by an administrator), automatically identified via an analysis of stored similarity values across a set of devices. etc.

Further, in certain embodiments, storage of the base similarity values can provide improved data security and privacy while enabling effective device identification. In general, the base similarity values do not expose the device attribute values on which they are based. Thus, in many cases, storage of the similarity values can greatly mitigate a risk of exposure or misuse of device attribute values.

Figure 2:
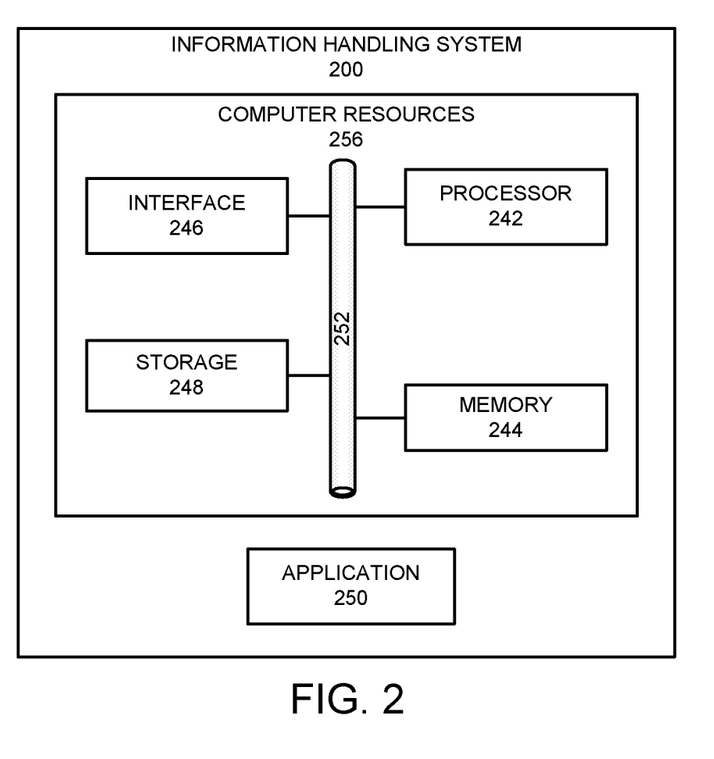
FIG. 2 illustrates an example of an information handling system.

FIG. 2 illustrates an example of an information handling system 200 that, in some cases, can be representative, for example, of the resources 102, the device management system 110 and/or the user systems 160. The information handling system 200 includes an application 250 operable to execute on computer resources 256. The application 250 can be similar, for example, to the policy administration module 130, the device registration module 132 and the policy enforcement module 134. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RIM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touchscreen, trackball, video camera, another suitable 110 device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM--drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
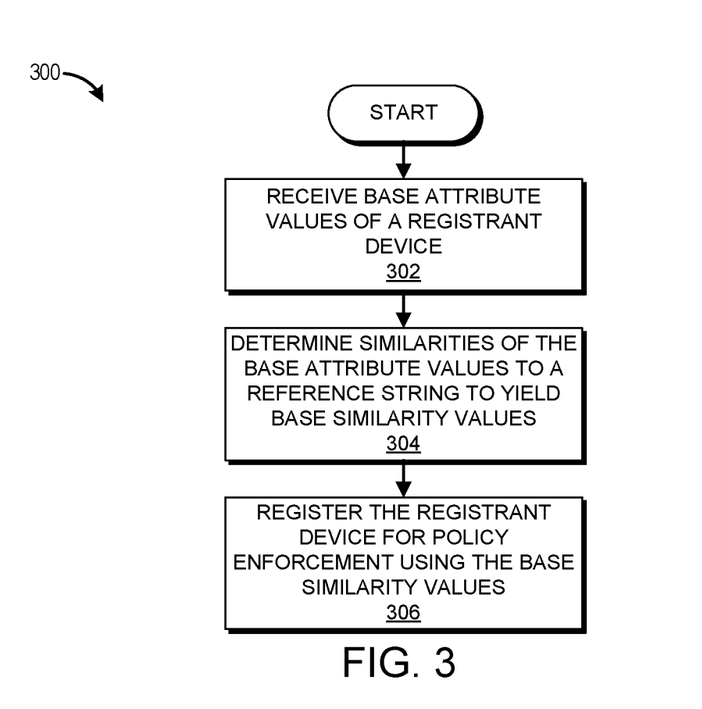
FIG. 3 illustrates an example of a process for registering a registrant device.

FIG. 3 illustrates an example of a process 300 for registering a registrant device. In some cases, the process 300 can be executed and/or repeated for each of a plurality of registrant devices (e.g., a set of devices for an organization, an organizational unit or subunit, etc.). The process 300, in whole or in part, can be implemented by one or more of the device management system 110, the policy administration module 130, the device registration module 132 and/or the policy enforcement module 134. The process 300 can also be performed generally by the computing environment 100. Although any number of systems, in whole or in part, can implement the process 300, to simplify discussion, the process 300 will be described in relation to the device registration module 132.

At block 302, the device registration module 132 receives base attribute values of a registrant device. The base attribute values can correspond to values of any of the device attributes described above. In a typical embodiment, the base attribute values can be received from the registrant device or from a resource that contains information about the registrant device.

At block 304, the device registration module 132 determines similarities of the base attribute values to a reference string to yield base similarity values. In general, the device registration module 132 can determine the similarities and yield the base similarity values in any of the ways described in relation to FIG. 1. For example, in an embodiment, each similarity value can be calculated using the formula shown below as Equation 1, where L represents a maximum string length between the reference string and the attribute value and E represents an edit distance between the attribute value and the reference string. The edit distance can be, for example, the minimum number of operations required to transform the attribute value into the reference string (or vice versa).

$$S = \frac{L-E}{L} \qquad \text{Equation 1}$$

At block 306, the device registration module 132 registers the registrant device for policy enforcement using the base similarity values. In general, the block 306 can include storing the base similarity values in relation to the registrant device and the respective device attributes to which they correspond.

Figure 4:
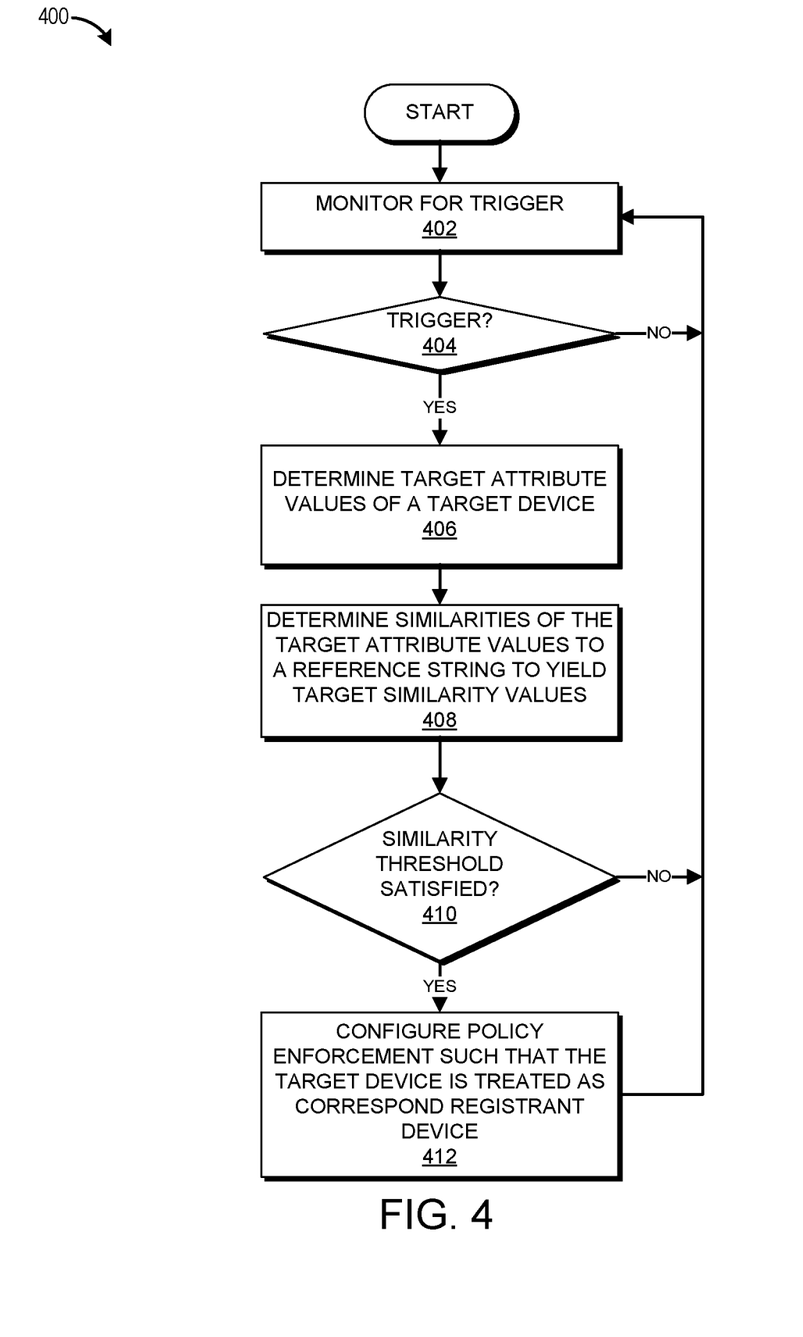
FIG. 4 illustrates an example of a process for policy enforcement.

FIG. 4 illustrates an example of a process 400 for policy enforcement. The process 400, in whole or in part, can be implemented by one or more of the device management system 110, the policy administration module 130, the device registration module 132 and/or the policy enforcement module 134. The process 400 can also be performed generally by the computing environment 100. Although any number of systems, in whole or in part, can implement the process 400, to simplify discussion, the process 400 will be described in relation to the policy enforcement module 134.

At block 402, the policy enforcement module 134 monitors for policy enforcement triggers of the type described in relation to FIG. 1. At decision block 404, the policy enforcement module 134 determines whether a policy enforcement trigger has been detected. If not, the process 400 returns to block 402 and proceeds as described above. Otherwise, if it is determined at decision block 404 that a policy enforcement trigger has been detected in relation to a target device, at block 406, the policy enforcement module 134 determines target attribute values of the target device. As described previously, the target attribute values can include whatever device attribute values of the target device that are available or accessible.

At block 408, the policy enforcement module 134 determines similarities of the target attribute values to a reference string to yield target similarity values. In general, the target similarity values can be determined as described with respect to block 304 in relation to base similarity values. For example, in an embodiment, each similarity value can be calculated using Equation 1 above.

At decision block 410, the policy enforcement module 134 determines whether a similarity threshold has been satisfied in relation to any particular registered device. In various embodiments, the similarity threshold can include configurable criteria relating to a degree to which the target similarity values must match the base similarity values of a given registered device in order for a match to be determined. In some embodiments, the similarity threshold can be assessed in relation to each registered device for which there are base similarity values in the data store 138.

In certain embodiments, the similarity threshold can include a plurality of alternative similarity thresholds expressed in terms of distinct combinations of device attributes. For example, for a given target device and a given registered device, the policy enforcement module 134 can determine for which device attributes there exist both target similarity values and base similarity values (i.e., an intersection) and, based thereon, identify an applicable similarity threshold.

In an example, the similarity threshold can require that some or all of the target similarity values exactly match, or be within a threshold range of, the base similarity values of a given registered device for a match to be determined. In addition, or alternatively, in embodiments in which base attribute values are stored in the data store 138 (e.g., in the form of hashes), the similarity threshold can require that similarly transformed target attribute values exactly match, or be within a configurable range or edit distance of, the stored base attribute values of a given registered device for a match to be determined.

In addition, or alternatively, the similarity threshold, or a component of the similarity threshold, can be a summation of the form shown below in Equation 2. In Equation 2, a similarity difference summation $f(x, y)$ is computed as a function of an array of target similarity values x and an array of base similarity values y, where each array includes n similarity values that are ordered to correspond to the same device attributes as the other array. In certain embodiments, if $f(x, y)$ is less than a configurable threshold, the similarity threshold (or a component of the similarity threshold) can be satisfied.

$$f(x, y) = \frac{1}{n}\sum_{i=1}^{n} |(x_i - y_i)| \qquad \text{Equation 2}$$

If it is determined at decision block 410 that the similarity threshold is not satisfied with respect to any particular registered device, the process 400 returns to block 402 and proceeds as described above. Otherwise, if it is determined at decision block 410 that the similarity threshold is satisfied with respect to a particular registered device, at block 412, the policy enforcement module 134 configures policy enforcement such that the target device is treated as the particular registered device. For example, the policy enforcement module 134 can select an applicable policy (e.g., from the data store 136) for the particular registered device and cause the selected policy to be applied (or in fact apply the selected policy) to the target device. From block 412, the process 400 returns to block 402 and proceeds as described above. In general, the process 400 can continue until terminated or configurable stop criteria is met.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A method comprising, by a computer system:
    responsive to a trigger, determining target attribute values of a target device;
    determining similarities of the target attribute values to a reference string;
    generating target similarity values in relation to the reference string for the target device based, at least in part, on the determined similarities of the target attribute values, wherein the target similarity values are representative of the determined similarities of the target attribute values to the reference string; and
    determining that the target similarity values satisfy a similarity threshold in relation to previously-determined base similarity values of a registered device, wherein the computer system uses the previously-determined base similarity values as a proxy for base attributes of the registered device, and
    wherein the computer system identifies the registered device in memory based, at least in part, on a composition of the previously-determined base similarity values; and
    responsive to the determination that the target similarity values satisfy the similarity threshold, configuring policy enforcement such that the target device is treated as the registered device.

2. The method of claim 1, wherein the computer system excludes storage of values of the base attributes.

3. The method of claim 1, comprising generating transformed values from raw device-attribute values of the target device, wherein the target attribute values comprise the transformed values.

4. The method of claim 3, wherein the generating transformed values comprises applying a hash function to the raw device-attribute values.

5. The method of claim 1, wherein the trigger comprises a user request to access a resource.

6. The method of claim 1, wherein the reference string comprises a randomly generated string of alphanumeric characters.

7. The method of claim 1, wherein the determining similarities of the target attribute values to the reference string comprises computing an edit distance.

8. The method of claim 1, wherein the configuring comprises:
    selecting an access policy applicable to the registered device; and
    applying the access policy to the target device.

9. The method of claim 1, comprising:
    determining a similarity difference summation with respect to the target similarity values and the previously-determined base similarity values; and
    wherein the similarity threshold comprises at least one criterion expressed in terms of the similarity difference summation.

10. The method of claim 1, wherein the similarity threshold requires that at least some of the target similarity values exactly match at least some of the previously-determined base similarity values.

11. The method of claim 1, wherein the similarity threshold requires that at least some of the target similarity values be within a configurable edit distance of at least some of the previously-determined base similarity values.

12. An information handling system comprising a
    processor and memory, wherein the processor and the memory in combination are operable to implement a method comprising:
    responsive to a trigger, determining target attribute values of a target device;
    determining similarities of the target attribute values to a reference string;
    generating target similarity values in relation to the reference string for the target device based, at least in part, on the determined similarities of the target attribute values, wherein the target similarity values are representative of the determined similarities of the target attribute values to the reference string; and
    determining that the target similarity values satisfy a similarity threshold in relation to previously-determined base similarity values of a registered device, wherein the information handling system uses the previously-determined base similarity values as a proxy for base attributes of the registered device, and wherein the information handling system identifies the registered device in the memory based, at least in part, on a composition of the previously-determined base similarity values; and
    responsive to the determination that the target similarity values satisfy the
        similarity threshold, configuring policy enforcement such that the target device is treated as the registered device.

13. The information handling system of claim 12, wherein the information handling system excludes storage of values of the base attributes.

14. The information handling system of claim 12, the method comprising generating transformed values from raw device-attribute values of the target device, wherein the target attribute values comprise the transformed values.

15. The information handling system of claim 14, wherein the generating transformed values comprises applying a hash function to the raw device-attribute values.

16. The information handling system of claim 12, wherein the trigger comprises a user request to access a resource.

17. The information handling system of claim 12, wherein the configuring comprises:
    selecting an access policy applicable to the registered device; and
    applying the access policy to the target device.

18. A computer-program product comprising a
    non-transitory computer-usable medium having computer-readable program code embodied therein, the computer-readable program code adapted to be executed to implement a method comprising:
    responsive to a trigger, determining target attribute values of a target device;
    determining similarities of the target attribute values to a reference string;
    generating target similarity values in relation to the reference string for the target device based, at least in part, on the determined similarities of the target attribute values, wherein the target similarity values are representative
of the determined similarities of the target attribute values to the reference string; and determining that the target similarity values satisfy a similarity threshold in relation to previously-determined base similarity values of a registered device, wherein the previously-determined base similarity values are used as a proxy for base attributes of the registered device, and wherein the registered device is identified in memory based, at least in part, on a composition of the previously-determined base similarity values; and responsive to the determination that the target similarity values satisfy the similarity threshold, configuring policy enforcement such that the target device is treated as the registered device.

\* \* \* \* \*